United States Patent
Liu

(10) Patent No.: US 11,971,877 B2
(45) Date of Patent: Apr. 30, 2024

(54) METHOD, APPARATUS, DEVICE, AND STORAGE MEDIUM FOR PROPOSAL MESSAGE PROCESSING FOR BLOCKCHAIN

(71) Applicant: Tencent Technology (Shenzhen) Company Limited, Shenzhen (CN)

(72) Inventor: Pan Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 86 days.

(21) Appl. No.: 17/724,336

(22) Filed: Apr. 19, 2022

(65) Prior Publication Data

US 2022/0237181 A1  Jul. 28, 2022

Related U.S. Application Data

(63) Continuation of application No. PCT/CN2021/091985, filed on May 7, 2021.

(30) Foreign Application Priority Data

Jun. 1, 2020  (CN) .......................... 202010482134.7

(51) Int. Cl.
   *G06F 16/23*  (2019.01)
   *G06F 21/64*  (2013.01)

(52) U.S. Cl.
   CPC .......... *G06F 16/2379* (2019.01); *G06F 21/64* (2013.01)

(58) Field of Classification Search
   None
   See application file for complete search history.

(56) References Cited

U.S. PATENT DOCUMENTS

2020/0120157 A1\* 4/2020 Xie ...................... H04L 9/0637
2020/0394154 A1\* 12/2020 Blackshear .......... H04L 9/0637
2021/0297238 A1\* 9/2021 Guo ..................... H04L 9/3239

FOREIGN PATENT DOCUMENTS

CN   110708171 A   1/2020
CN   110943838 A   3/2020
(Continued)

OTHER PUBLICATIONS

Tencent Technology, ISR, PCT/CN2021/091985, dated Jul. 21, 2021, 2 pgs.
(Continued)

*Primary Examiner* — Kris E Mackes
*Assistant Examiner* — Cao D Vuong
(74) *Attorney, Agent, or Firm* — Morgan, Lewis & Bockius LLP

(57) ABSTRACT

A computer device obtains a block proposal message and obtains a first block from the block proposal message. In accordance with a determination that a current consensus node of the computer device has a second block in a locked state and a block height of the first block is the same as a block height of the second block, the computer device deletes the block proposal message and obtains block voting information of the second block in a first consensus stage. The locked state is a state of a block that has passed the first consensus stage and has not passed a second consensus stage. The computer device obtains block submission voting information of the second block in the second consensus stage according to the block voting information, and determines a consensus result corresponding to the second block according to the block submission voting information.

20 Claims, 8 Drawing Sheets

(56) References Cited

FOREIGN PATENT DOCUMENTS

| CN | 110995701 A | * | 4/2020 | ............. H04L 63/08 |
|----|-------------|---|--------|--------------------------|
| CN | 110995790 A |   | 4/2020 |                          |
| CN | 111061769 A |   | 4/2020 |                          |
| CN | 111382456 A |   | 7/2020 |                          |

OTHER PUBLICATIONS

Tencent Technology, WO, PCT/CN2021/091985, dated Jul. 21, 2021, 5 pgs.
Tencent Technology, IPRP, PCT/CN2021/091985, dated Dec. 6, 2022, 6 pgs.

* cited by examiner

METHOD, APPARATUS, DEVICE, AND STORAGE MEDIUM FOR PROPOSAL MESSAGE PROCESSING FOR BLOCKCHAIN

CROSS-REFERENCE TO RELATED APPLICATIONS

This application is a continuation application of PCT Patent Application No. PCT/CN2021/091985, entitled "PROPOSAL MESSAGE PROCESSING METHOD AND APPARATUS FOR BLOCKCHAIN, AND DEVICE AND STORAGE MEDIUM" filed on May 7, 2021, which claims priority to Chinese Patent Application No. 202010482134.7, filed with the State Intellectual Property Office of the People's Republic of China on Jun. 1, 2020, and entitled "METHOD, APPARATUS, DEVICE, AND STORAGE MEDIUM FOR PROPOSAL MESSAGE PROCESSING", all of which are incorporated herein by reference in their entirety.

FIELD OF THE TECHNOLOGY

This application relates to the field of blockchain technologies, and in particular, to a method, apparatus, device, and computer-readable storage medium for proposal message processing for a blockchain.

BACKGROUND OF THE DISCLOSURE

A blockchain is a decentralized distributed ledger system with the characteristics of tamper-proofing, decentralization, and openness. As the core of blockchain technology, the consensus mechanism can ensure that the latest blocks are accurately added to the blockchain, and that the blockchain information stored by nodes is consistent. Consensus nodes play an important role in the consensus mechanism.

In the related art, a consensus node may verify a new block generated in the blockchain network, generate voting information corresponding to the new block according to a result of the verification, and broadcast the voting information in the blockchain network. Each consensus node in the blockchain network may obtain the voting information of the other consensus nodes for the new block and calculate a quantity of approval votes for the new block. When the approval vote quantity for the new block reaches a quantity threshold, the consensus node may write the new block. However, some consensus nodes in the blockchain network may fail to obtain complete voting information due to network disconnection or delay, resulting in that the calculated approval vote quantity for the new block is less than the quantity threshold. In this case, these consensus nodes determine that the new block has not passed the consensus verification. As a result, some consensus nodes in the blockchain network write the new block, and some consensus nodes does not write the new block, leading to inconsistency of data on the blockchain.

SUMMARY

Embodiments of this application provide a method, apparatus, device, and computer-readable storage medium for proposal message processing for a blockchain.

A proposal message processing method for a blockchain, executed by a consensus node, the consensus node being a computer device, the method including:

obtaining a block proposal message, and obtaining a first block from the block proposal message;

deleting the block proposal message in accordance with a determination that the current consensus node has a second block in a locked state and a block height of the first block is the same as a block height of the second block, and obtaining block voting information of the second block in a first consensus stage, the locked state being a state of a block that has passed the first consensus stage and has not passed a second consensus stage; and obtaining block submission voting information of the second block in the second consensus stage according to the block voting information, and determining a consensus result corresponding to the second block according to the block submission voting information.

One aspect of the embodiments of this application provides a proposal message processing apparatus for a blockchain, including:

a block obtaining module, configured to obtain a block proposal message, and obtaining a first block from the block proposal message;

a voting information obtaining module, configured to delete the block proposal message in accordance with a determination that the current consensus node has a second block in a locked state and a block height of the first block is the same as a block height of the second block, and obtain block voting information of the second block in a first consensus stage, the locked state being a state of a block that has passed the first consensus stage and has not passed a second consensus stage; and a first consensus result determining module, configured to obtain block submission voting information of the second block in the second consensus stage according to the block voting information, and determine a consensus result corresponding to the second block according to the block submission voting information.

A computer device, including a memory and one or more processors, the memory storing computer-readable instructions, the computer-readable instructions, when executed by the one or more processors, causing the one or more processors to execute the operations of the above proposal message processing method for a blockchain.

One or more non-volatile (e.g., non-transitory) computer-readable storage media storing computer-readable instructions are provided, the computer-readable instructions, when executed by one or more processors, causing the one or more processors to perform the operations of the above blockchain message processing method for a blockchain.

A computer program product or a computer program is provided, the computer program product or the computer program including computer-readable instructions, the computer-readable instructions being stored in a computer-readable storage medium, a processor of a computer device reading the computer-readable instructions from the computer-readable storage medium, and the processor executing the computer-readable instructions to cause the computer device to perform the operations of the above blockchain message processing method for a blockchain.

BRIEF DESCRIPTION OF THE DRAWINGS

To describe the technical solutions in the embodiments of this application or in the related art more clearly, the following briefly describes the accompanying drawings required for describing the embodiments or the related art.

Apparently, the accompanying drawings in the following description show only some embodiments of this application, and a person of ordinary skill in the art may derive other drawings from the accompanying drawings without creative efforts.

DESCRIPTION OF EMBODIMENTS

Figure 1:
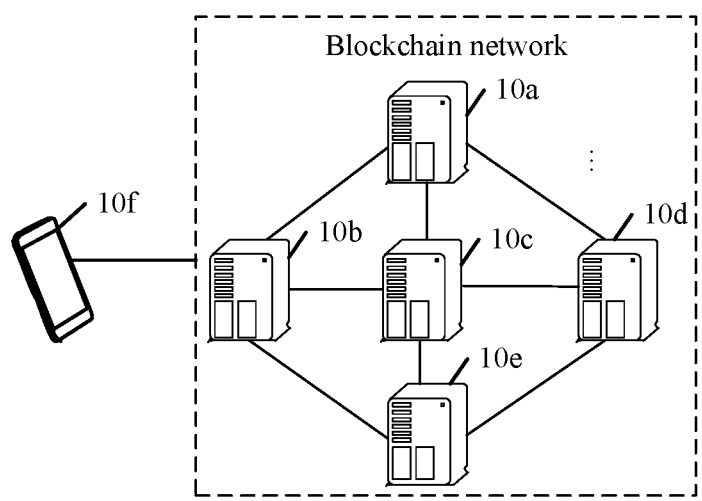
FIG. 1 is a diagram of a network architecture according to an embodiment of this application.

The technical solutions in the embodiments of this application are clearly and completely described in the following with reference to the accompanying drawings in the embodiments of this application. The described embodiments are merely some rather than all of the embodiments of this application. All other embodiments obtained by a person of ordinary skill in the art based on the embodiments of this application without creative efforts shall fall within the protection scope of this application.

A blockchain is a new application mode of computer technologies such as distributed data storage, point-to-point (P2P) transmission, consensus mechanisms, and encryption algorithms. The blockchain is essentially a decentralized database and is a string of data blocks generated through association by using a cryptographic method. Each data block includes information of a batch of network transactions, the information being used for verifying the validity of information of the data block (anti-counterfeiting) and generating a next data block. The blockchain may include an underlying blockchain platform, a platform product service layer, and an application service layer.

The underlying blockchain platform may include user management, basic service, smart contract, operation monitoring, and other processing modules. The user management module is responsible for identity information management of all blockchain participants, including maintenance of public and private key generation (account management), key management, and maintenance of a correspondence between a real identity of a user and a blockchain address (authority management), and when authorized, supervising and auditing transactions of some real identities and providing rule configuration for risk control (risk control audit). The basic service module is deployed on all blockchain node devices to verify the validity of service requests, and record valid requests in a storage after consensus. For a new service request, the basic service module first performs interface adaption analysis and authentication processing (interface adaption), and then encrypts service information by using a consensus algorithm (consensus management), and after the encryption, the information is completely and consistently transmitted to a shared ledger (network communication), and is recorded and stored. The smart contract module is responsible for contract registration and issuance, contract triggering, and contract execution. Developers may define contract logic through a specific programming language and publish the logic on the blockchain (contract registration). According to the logic of contract terms, the smart contract module completes the contract logic by invoking a key or when triggered by another event, which also provides functions of contract upgrade and cancellation. The operation monitoring module is mainly responsible for deployment during the product release process, configuration modification, contract settings, cloud adaptation, and visual outputting of a real-time status during product operation, for example, warning, monitoring network conditions, and monitoring a health status of a node device.

FIG. 1 is a diagram of a network architecture according to an embodiment of this application. As shown in FIG. 1, the network architecture may include a plurality of node devices, which, as shown in FIG. 1, may include a node device 10a, a node device 10b, a node device 10c, a node device 10d, and a node device 10e in a blockchain network, and a node device 10f The node device 10a, the node device 10b, the node device 10c, the node device 10d, and the node device 10e may all be represented as blockchain nodes in the blockchain network. The blockchain nodes may include consensus nodes and synchronization nodes. The consensus nodes can share blockchain data in the blockchain network, and can participate in the block consensus process in the blockchain network. The synchronization node can share the blockchain data in the blockchain network, and does not have permission to participate in the consensus process of the blockchain network. The node device 10f is a node device outside the blockchain network. The node device 10f can upload transaction data to the blockchain network in the form of network message data.

After completing identity registration in the blockchain network, the node device 10f may upload transaction data to the blockchain network. After receiving the transaction data uploaded by the node device 10f, a blockchain node in the blockchain network may package the transaction data into a new block, and broadcast the new block to the consensus nodes in the blockchain network in the form of a block proposal message, so that the consensus nodes perform a consensus verification on the new block. A new block on which a consensus is reached in the blockchain network can be added to the blockchain. After receiving the block proposal, the consensus node in the blockchain network may detect whether there is a locked block locally in the current consensus node. If there is a locked block locally in the current consensus node, consensus processing may be performed on the locked block in the current consensus cycle. If there is no locked block locally in the current consensus node, consensus processing is performed on the new block in the current consensus cycle. A consensus cycle in the blockchain network may include a first consensus stage and a second consensus stage. The consensus cycle may be understood as an entire consensus process of a single block. For example, a consensus process of a block 1 in the blockchain network may be called one consensus cycle. After the consensus process of the block 1 is complete, a next consensus cycle, e.g., a consensus process of a next block 2, is entered. The locked block may be a block that has passed the first consensus stage and has not passed the second consensus stage, that is, the locked block is a block for which a consensus process has been performed in the blockchain network. In other words, if a locked block is detected locally in the current consensus node, consensus processing may be performed on the locked block again in the current consensus cycle, thereby reducing the risk of inconsistency of data on the blockchain.

The node device 10a, the node device 10b, the node device 10c, the node device 10d, the node device 10e, and the node device 10f may each be a computer device. The computer device may be a terminal device or a server. The terminal device may include, but is not limited to, a smart phone, a tablet computer, a laptop computer, a desktop computer, a personal digital assistant, a mobile internet device (MID), a wearable device (such as a smart watch, a smart band, etc.), etc. The server may be an independent physical server, or may be a server cluster including a plurality of physical servers or a distributed system, or may be a cloud server providing a cloud computing service. The terminal and the server may be directly or indirectly connected through wired or wireless communication, which is not limited in this application.

Cloud computing refers to the delivery and use mode of IT infrastructure, and refers to obtaining the required resources through the network in an on-demand and easily scalable manner. In a broad sense, cloud computing refers to the delivery and use mode of services, and refers to obtaining the required services through the network in an on-demand and easily scalable manner. Such services may be IT, software, Internet-related, or any other service. Cloud computing is a product of integration of traditional computer and network technologies such as grid computing, distributed computing, parallel computing, utility computing, network storage technologies, virtualization, and load balance.

Cloud computing has grown rapidly with the development of the Internet, real-time data streaming, the diversification of connected devices, and the need for search services, social networking, mobile commerce, and open collaboration. Different from conventional parallel/distributed computing, the advent of cloud computing will promote revolutionary changes in the entire Internet model and enterprise management model.

Figure 2:
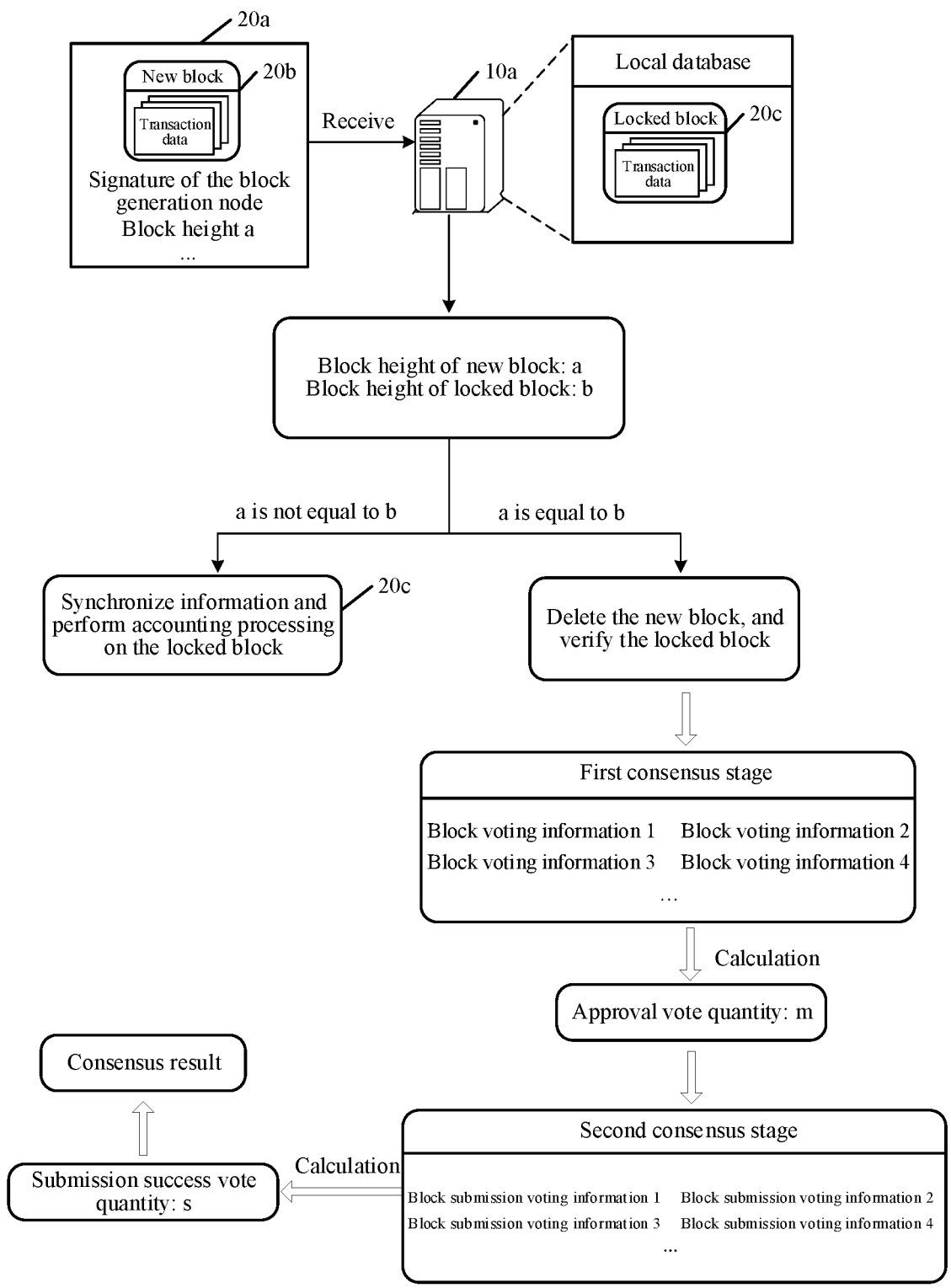
FIG. 2 is a schematic diagram of a proposal message processing scenario for a blockchain according to an embodiment of this application.

FIG. 2 is a schematic diagram of a proposal message processing scenario for a blockchain according to an embodiment of this application. A blockchain node in a blockchain network may collect transaction data in the blockchain network, and package the collected transaction data into a new block. The blockchain node that generates the new block may also be referred to as a block generation node. The block generation node may broadcast the new block in the blockchain network in the form of a proposal message. Each consensus node in the blockchain network may obtain the proposal message broadcast by the block generation node, and process the proposal message. When the node device 10a in the embodiment corresponding to FIG. 1 is a consensus node, the proposal message processing solution for a blockchain that is proposed in this application is described using the node device 10a as an example. As shown in FIG. 2, the blockchain node in the blockchain network may package transaction data into a new block 20b, and broadcast the new block 20b in the blockchain network in the form of a proposal message 20a. The proposal message 20a may include, but is not limited to, the new block 20b generated by the blockchain node (where the blockchain node in this case is the block generation node), signature information of the block generation node, an operating status of the block generation node, and a block height a of the new block 20b. The new block 20b may include a plurality of pieces of transaction data uploaded by a client to the blockchain network. Each piece of transaction data may refer to data generated by the client according to a user's transaction operation. Each piece of transaction data may include a transaction initiator, a transaction recipient, and a transaction content. The plurality of pieces of transaction data included in the new block 20b may be uploaded to the blockchain network by the same client within a period of time, or uploaded to the blockchain network by different clients within a period of time.

After receiving the proposal message 20a, the node device 10a (which is a consensus node in the blockchain network) may check a local database of the node device 10a, and if there is a locked block 20c in the local database, may further obtain a block height b corresponding to the locked block 20c and the block height a corresponding to the new block 20b. The locked block 20c may be understood as a block in a locked state. The locked state is a state of a block that has passed the first consensus stage and has not passed a second consensus stage. Having passed the first consensus stage means that an approval vote quantity obtained for the locked block 20c in the first consensus stage of the previous consensus cycle is greater than or equal to a quantity threshold (e.g., $\frac{2}{3}$ of the total quantity of all consensus nodes in the blockchain network), and having not passed the second consensus stage means that a submission success vote quantity obtained for the locked block 20c in the second consensus stage of the previous consensus cycle is less than a quantity threshold. The approval vote quantity may refer to a total quantity of approval vote information among the voting information of the consensus nodes for the locked block 20c in the first consensus stage. The submission success vote quantity may refer to a total quantity of submission success voting information among the submission voting information of the consensus nodes for the locked block 20c in the second consensus stage.

After obtaining the block height a corresponding to the new block 20b and the block height b corresponding to the locked block 20c, the node device 10a may compare the block height a and the block height b. When the block height a corresponding to the new block 20b is the same as the block height b corresponding to the locked block 20c, it indicates that the consensus nodes in the blockchain network have determined that the locked block 20c has not passed the consensus verification in the previous consensus cycle, and have not written the locked block 20c to the blockchain. In this case, the node device 10a may delete the proposal message 20b, perform consensus verification on the locked block 20c in the current consensus cycle, and obtain block voting information of the node device 10a for the locked block 20c in the first consensus stage. The node device 10a may broadcast the block voting information of the node device 10a for the locked block 20c, so that the other consensus nodes in the blockchain network can obtain the block voting information of the node device 10a for the locked block 20c. Each consensus node in the blockchain network may broadcast block voting information of itself for the locked block 20c. Therefore, the node device 10a may obtain the block voting information of each consensus node in the blockchain network for the locked block 20c in the first consensus stage. For example, the blockchain network includes n consensus nodes, namely, node device 10a, consensus node 1, consensus node 2, . . . , and consensus node n−1. The block voting information of the node device 10a in the first consensus stage is block voting information 1, the block voting information of the consensus node 1 in the first consensus stage is block voting information 2, the block voting information of the consensus node 2 in the first consensus stage is block voting information 3, . . . , and the block voting information of the consensus node n−1 in the first consensus stage is block voting information n.

The node device 10a may collect statistics on all the obtained block voting information, and obtain an approval vote quantity m corresponding to the locked block 20c in the first consensus stage. The node device 10a may generate block submission voting information 1 in the second consensus stage according to the approval vote quantity m. When the approval vote quantity m is greater than or equal to ⅔ of the total quantity of all the consensus nodes, the block submission voting information 1 generated by the node device 10a is submission success voting information. When the approval vote quantity m is less than ⅔ of the total quantity of all the consensus nodes, the block submission voting information 1 generated by the node device 10a is submission failure voting information. Similarly, the node device 10a may broadcast the block submission voting information 1, and may also obtain block submission voting information corresponding to the other consensus nodes. The node device 10a may collect statistics on the obtained block submission voting information respectively corresponding to all the consensus nodes, obtain a submission success vote quantity s corresponding to the locked block 20c in the second consensus stage, and determine a consensus result corresponding to the locked block 20c in the current consensus cycle according to the submission success vote quantity s. When the consensus result is a consensus success result, the node device 10a may officially write the locked block 20c into the blockchain. After the locked block 20c is officially written into the blockchain, there is no block in the locked state in the local database of the node device 10a.

When the block height a corresponding to the new block 20b is different from the block height b corresponding to the locked block 20c (for example, the block height a is greater than the block height b), it indicates that the other consensus nodes in the blockchain network other than the node device 10a have already determined that the locked block 20c passes the consensus verification in the previous consensus cycle and have written the locked block 20c into the blockchain, but the node device 10a may fail to receive the voting information corresponding to all the consensus nodes due to delay or network disconnection, determine that the locked block 20c does not pass the consensus verification, and has not officially written the locked block 20c into the blockchain. In this case, the node device 10a may determine the locked block 20c in the local database as a valid block, obtain synchronization information from the other consensus nodes in the blockchain network, and officially add the valid block and the synchronization information to the blockchain, thereby realizing the data synchronization process between the node device 10a and the other consensus nodes.

In the embodiments of this application, a first block in a block proposal message is obtained; if a current consensus node has a second block in a locked state and a block height of the first block is the same as a block height of the second block, the block proposal message is deleted, and block voting information of the second block in a first consensus stage is obtained, where the locked state is a state of a block that has passed the first consensus stage and has not passed a second consensus stage; block submission voting information of the second block in the second consensus stage is obtained according to the block voting information; and a consensus result corresponding to the second block is determined according to the block submission voting information. It can be seen that the consensus process for a block in the blockchain network may include the first consensus stage and the second consensus stage. When receiving a block proposal message, the current consensus node may detect whether the current consensus node has a block in the locked state locally. If the current consensus node has a block in the locked state locally, the current consensus node may preferentially perform a consensus verification on the locked block to obtain a consensus result corresponding to the block in the locked state, and determine whether to add the block in the locked state to the blockchain based on the consensus result. Accordingly, the quality of blocks added to the blockchain can be ensured, thereby reducing the risk of inconsistency of data on the blockchain.

Figure 3:
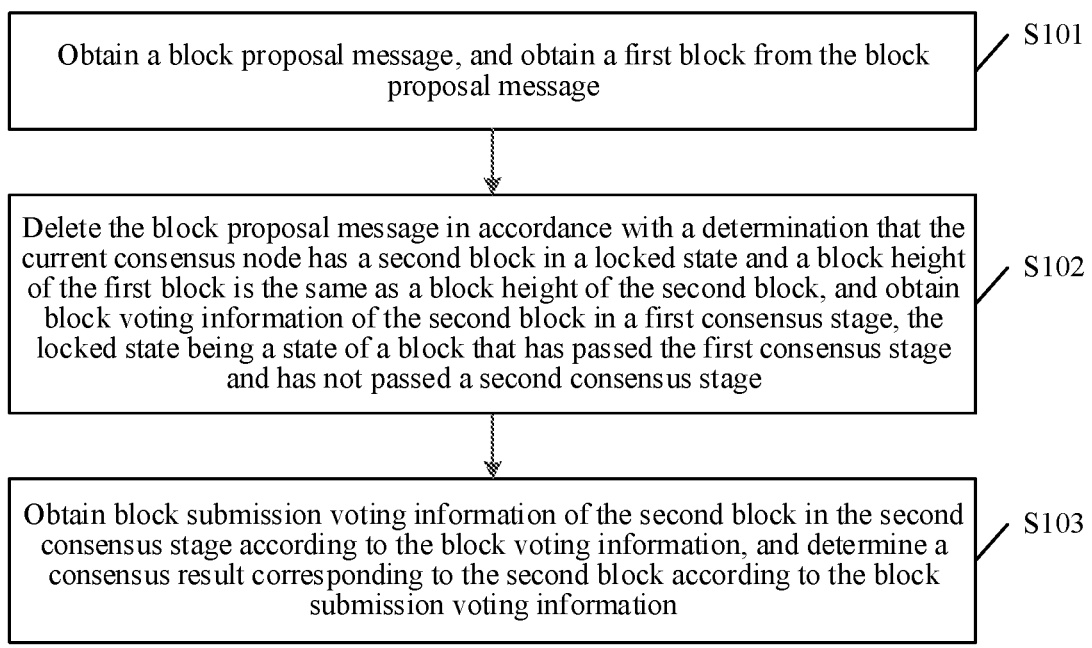
FIG. 3 is a schematic flowchart of a proposal message processing scenario for a blockchain according to an embodiment of this application.

FIG. 3 is a schematic flowchart of a proposal message processing scenario for a blockchain according to an embodiment of this application. It may be understood that this method may be performed by a consensus node in a blockchain network, the consensus node may be a node server in the blockchain network or other node devices in a consensus network, and the consensus node is a computer device. As shown in FIG. 3, the proposal message processing scenario for a blockchain may include the following steps:

Step S101: Obtain a block proposal message, and obtain a first block from the block proposal message.

Specifically, each consensus node in the blockchain network may be configured to perform a consensus process in the blockchain network. When receiving transaction data uploaded by a client, a blockchain node in the blockchain network may package the transaction data uploaded by the client to the blockchain network into a new block (e.g., the new block 20b in the embodiment corresponding to FIG. 2), and broadcast a block proposal message including the new block (e.g., the proposal message 20a in the embodiment corresponding to FIG. 2). The consensus node in the blockchain network (where the consensus node in this case may be referred to as the current consensus node, e.g., the node device 10a in the embodiment corresponding to FIG. 2) may obtain the block proposal message broadcast by the blockchain node, and determine the new block included in the block proposal message as the first block. The block proposal message may include, but is not limited to: the block generation node corresponding to the first block (e.g., the blockchain node that generates the first block), the first block, signature information of the block generation node, an operating status of the block generation node, and a block height corresponding to the first block. The first block may include a block header and a block body. The block header stores an input information feature value of the first block (also called a current block hash value), a block header feature value of the previous block (also called a previous block hash value), a version number, a timestamp, and a difficulty value. The block body stores a plurality of pieces of transaction data. Each piece of transaction data may refer to data generated by the client according to a user's transaction operation.

It may be understood that before uploading transaction data to the blockchain network, a client may locally generate a key pair (which may include a public key and a private key). The private key in the key pair may be managed by the client. The private key may be used for generating a digital signature of the client. The public key in the key pair may be uploaded to the blockchain network. The public key may be used for a blockchain node in the blockchain network to verify a signature of the transaction data uploaded by the client. After the client uploads the public key to the blockchain network, the client may obtain a blockchain account address, indicating that the client has completed an identity registration in the blockchain network. The client having completed the identity registration may transmit transaction data to the blockchain network. The public key in the blockchain network is unique, and one public key corresponds to one client.

Step S102: Delete the block proposal message in accordance with a determination that the current consensus node has a second block in a locked state and a block height of the first block is the same as a block height of the second block, and obtain block voting information of the second block in a first consensus stage, the locked state being a state of a block that has passed the first consensus stage and has not passed a second consensus stage.

Specifically, after obtaining the first block, the current consensus node may first detect whether a local database of the current consensus node has a block in the locked state. If the local database of the current consensus node has a second block in the locked state, the consensus node may further obtain block heights corresponding to the first block and the second block respectively. If the block height corresponding to the first block is the same as the block height corresponding to the second block, the current consensus node may delete the block proposal message and determines that a block requiring a consensus verification in the current consensus cycle is the second block. The current consensus node may obtain the block voting information of each consensus node in the blockchain network for the second block in the first consensus stage. A consensus process of all consensus nodes included in the blockchain network for a block may be referred to as one consensus cycle. Each consensus cycle may include a plurality of consensus stages, such as the first consensus stage and the second consensus stage. A block passing the consensus verification within the consensus cycle can be officially added to the blockchain. The locked state refers to a state of a block that passes consensus verification in the first consensus stage of the previous consensus cycle and fails consensus verification in the second consensus stage of the previous consensus cycle. Therefore, the second block refers to a block that passes consensus verification in the first consensus stage of the previous consensus cycle and fails consensus verification in the second consensus stage of the previous consensus cycle as determined by the current consensus node. After the previous consensus cycle is complete, the current consensus node may enter a next consensus cycle (e.g., the current consensus cycle) after receiving the block proposal message. The current consensus node may determine a block requiring consensus verification in the current consensus cycle according to the block heights corresponding to the first block and the second block respectively. For example, when the block height corresponding to the first block is the same as the block height corresponding to the second block, it indicates that no consensus in the blockchain network is reached for the second block in the previous consensus cycle, and another blockchain node generates the first block with the same block height as the second block, that is, the first block and the second block may be generated by different blockchain nodes. In this case, the current consensus node may delete the newly received first block, and perform consensus verification on the second block in the locked state in the current consensus cycle, obtain block voting information for the second block in the first consensus stage of the current consensus cycle. Each consensus node in the blockchain network may perform consensus verification on the second block in the current consensus cycle to obtain a verification result of the second block in the first consensus stage, and generate block voting information corresponding to each consensus node. The block voting information may include the voting information of the current consensus node for the second block and the voting information of the other consensus nodes for the second block in the first consensus stage.

The process of obtaining the block voting information may be as follows: The current consensus node may obtain a block generation node corresponding to the second block, and obtain a node committee list in the blockchain network, where the node committee list may include consensus nodes in the blockchain network that are in a valid operating state, and each consensus node included in the node committee list may be configured to collect transaction data in the blockchain network, package the transaction data into a block, and broadcast the block. A sequential position of a consensus node in the node committee list may be used for indicating a sequential position of the consensus node in performing block generation. Blocks in the blockchain network may all be generated through packaging by the consensus nodes in the node committee list. For example, the consensus nodes included in the node committee list are arranged in the following order: consensus node 1-consensus node 2-consensus node 3-consensus node 4. In the blockchain network, the consensus node 1 packages transaction data into a block 1. After a consensus process for the block 1, it may be determined according to the order of the consensus nodes in the node committee list that the consensus node that is to generate a next block (e.g., block 2) is the consensus node 2.

The current consensus node may execute the transaction data included in the second block to obtain a transaction result corresponding to the transaction data, and determine first voting information of the current consensus node for the second block in the first consensus stage according to the block generation node, the node committee list, and the transaction result. The transaction result refers to a result obtained after the current consensus node executes each piece of transaction data according to the transaction initiator, the transaction recipient, and the transaction content included in the transaction data. For example, in the transaction data, the transaction initiator is account a, the transaction recipient is account b, and the transaction content is: transferring 10 game coins from account a to account b. In this case, the current consensus node may execute the transaction data according to the transaction content, and obtain a transaction result after the execution of the transaction data. If the transaction result is that 10 game coins have been deducted from account a and 10 game coins have been added to account b, it may be determined that the transaction result is a valid result. If the transaction result is that the balance of account a is insufficient and none of the quantities of the game coins in account a and account b has changed, it may be determined that the transaction result is an invalid result. Further, after the current consensus node obtains the block generation node of the second block, the node committee list, and the transaction result corresponding to each transaction data, when the current consensus node detects that the block generation node belongs to the node committee list and the transaction result is a valid result, the current consensus node may determine that the verification result of the second block in the first consensus stage is a verification success result, and generate the first voting information corresponding to the current consensus node according to the verification success result. When the current consensus node detects that the block generation node does not belong to the node committee list or the transaction result is an invalid result, the current consensus node may determine that the verification result of the second block in the first consensus stage is a verification failure result, and generates the first voting information corresponding to the current consensus node according to the verification failure result. The first voting information may be approval vote information or disapproval vote information. The approval vote information may indicate that the verification result of the current consensus node for the second block is the verification success result. The disapproval vote information may indicate that the verification result of the current consensus node for the second block is the verification failure result. In some embodiments, in addition to detecting the block generation node and the transaction result after the execution of the transaction data, the verification process of the second block by the current consensus node may also include detecting whether a preceding hash value included in a block header of the second block is a hash value corresponding to a previous block of the second block (where a block height of the previous block is lower than the block height of the second block by 1), whether the difficulty value in the block header is correct, and so on. When the previous hash value included in the block header is different from the hash value corresponding to the previous block or the difficulty value in the block header is wrong, the current consensus node may determine that the verification result of the second block in the first consensus stage is the verification failure result. When the block generation node belongs to the node committee list, the transaction result is a valid result, the previous hash value included in the block header is the same as the hash value corresponding to the previous block, and the difficulty value in the block header is correct, the current consensus node may determine that the verification result of the second block in the first consensus stage is the verification success result.

The current consensus node may broadcast the first voting information in the blockchain network, so that the other consensus nodes in the blockchain network other than the current consensus node obtain the first voting information. The other consensus nodes in the blockchain network may also perform consensus verification on the second block to obtain second voting information of the other consensus nodes for the second block, and broadcast the second voting information in the blockchain network. Therefore, the current consensus node may obtain the second voting information of the other consensus nodes on the second block in the first consensus stage, and the current consensus node may determine both the first voting information and the second voting information as the block voting information of the second block in the first consensus stage. In some embodiments, when the current consensus node receives the second voting information broadcast by the other consensus nodes, an information receiving time range may be preset in the blockchain network, the second voting information received by the current consensus node within the information receiving time range may be determined as the block voting information, and the second voting information received outside the information receiving time range cannot be used as the block voting information of the second block. For example, when the information receiving time range is 1 hour, the second voting information received by the current consensus node within one hour after obtaining the block proposal message may be determined as the block voting information, and the second voting information received after more than one hour cannot be determined as the block voting information.

In some embodiments, if there is a second block in the locked state in the local database of the current consensus node and the block height of the first block is greater than the block height of the second block, the current consensus node may switch the locked state corresponding to the second block to a released state, and determine the second block in the release stated as a valid block. The current consensus node may obtain synchronization information associated with the second block from the blockchain network, and perform accounting processing on the synchronization information and the valid block. In other words, when the block height of the first block is greater than the block height of the second block, it indicates that the other consensus nodes in the blockchain network have recorded the second block in the ledger, that is, the other consensus nodes have officially added the second block to the block chain, and it may be determined that a local ledger (i.e., the local blockchain) of the current consensus node lacks the second block compared with the ledgers of the other consensus nodes. Therefore, the current consensus node may switch the locked state corresponding to the second block to the released state, determine the second block in the released state as a valid block, send a message to the other consensus nodes to request the synchronization information associated with the second block, and perform accounting processing on the valid block and the synchronization information, that is, obtain the synchronization information from the other consensus nodes to achieve the data synchronization between the current consensus node and the other consensus nodes.

Figure 4:
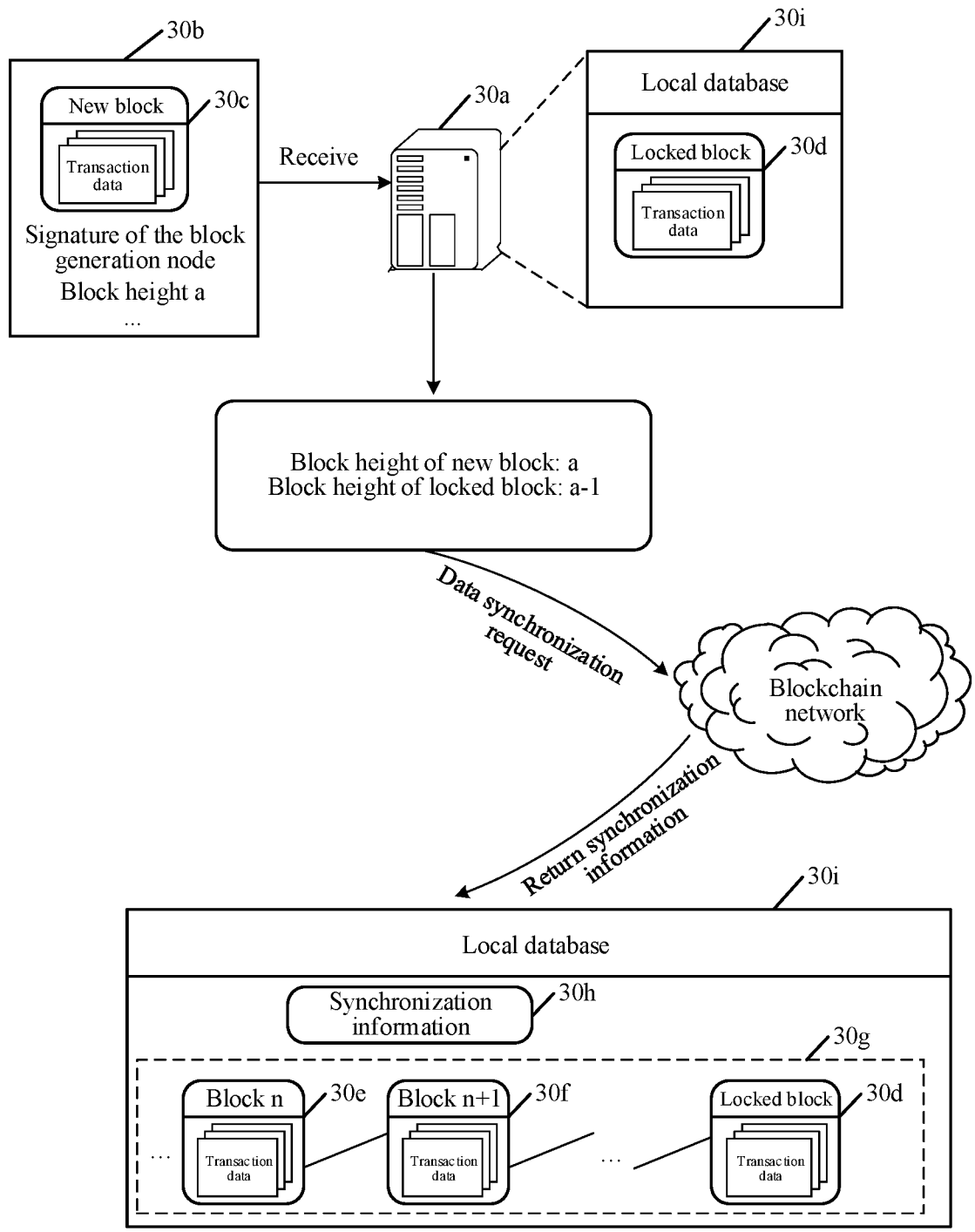
FIG. 4 is a schematic diagram of synchronizing local data of a consensus node according to an embodiment of this application.

FIG. 4 is a schematic diagram of synchronizing local data of a consensus node according to an embodiment of this application. As shown in FIG. 4, a consensus node 30a in a blockchain network (where the consensus node 30a in this case may be understood as a current consensus node) may receive a block proposal message 30b and obtain a new block 30c (e.g., the above-mentioned first block) from the block proposal message 30b. The block proposal message 30b may be generated by another consensus node in the blockchain network (a consensus node other than the consensus node 30a). The block proposal message 30b may include the new block 30c, a signature of the block generation node that generates the new block 30c, a block height a corresponding to the new block 30c, etc. The new block 30c may include a block header and a block body. The block header stores information such as a hash value corresponding to the new block 30c, a hash value of a previous block, a difficulty value, a timestamp, a version number, etc. The block body stores a plurality of pieces of transaction data uploaded by a client to the blockchain network. The consensus node 30a may detect data stored in a local database 30i, and when the local database 30i stores a locked block 30d in a locked state (i.e., the above-mentioned second block), obtain a block height corresponding to the locked block 30d. If the block height of the locked block 30d is a−1, it may be determined that the block height a of the new block 30c is greater than the block height a−1 of the locked block 30d by 1. In this case, it may be determined that the block generation node that generates the new block 30c has officially added the locked block 30i with the block height of a−1 to the blockchain, which indicates that the consensus node 30a may have obtained an incorrect statistical result for the voting information of the locked block 30d within the previous consensus cycle due to a network fault (such as delay, network disconnection, etc.), have determined that the locked block 30d does not pass the consensus verification, and have not officially added the locked block 30d to the blockchain. Therefore, the blockchain network may determine that the locked block 30d is a valid block, that is, that data included in the locked block 30d is valid data and a consensus has been reached in the blockchain network for the locked block 30d, without needing to executing a consensus process on the locked block 30d again. The consensus node 30d may transmit a data synchronization request to the other consensus nodes in the blockchain network. The data synchronization request may be used for requesting to synchronize data with the other consensus nodes in accordance with a determination that blockchain data included in the consensus node 30a is different from that included in the other consensus nodes, to achieve synchronization of the blockchain data between the consensus node 30a and the other consensus nodes.

After receiving the data synchronization request transmitted by the consensus node 30a, the other consensus node in the blockchain network may return synchronization information 30h associated with the locked block 30d to the consensus node 30a. The synchronization information 30h may refer to a message event of the locked block 30d, e.g., voting information of locked block 30d, a transaction execution result, and other information. After receiving the synchronization information 30h returned by the other consensus nodes, the consensus node 30a may store the synchronization information 30h in the local database 30i, and officially add the locked block 30d to the blockchain, that is, write the locked block 30d into a blockchain 30g stored in the local database 30i of the consensus node 30a. The blockchain 30g is a blockchain stored locally and shared with the other consensus nodes by the consensus node 30a. After obtaining the synchronization information and officially adding the locked block 30d to the blockchain, the consensus node 30a, the data synchronization between the consensus node 30a and the other consensus nodes can be realized.

Step S103: Obtain block submission voting information of the second block in the second consensus stage according to the block voting information, and determine a consensus result corresponding to the second block according to the block submission voting information.

Specifically, after obtaining the block voting information of the second block in the first consensus stage, the current consensus node may calculate a quantity of approval vote information among the block voting information of the second block in the first consensus stage, and determine the block submission voting information of the second block in the second consensus stage according to the quantity of approval vote information. The other consensus nodes in the blockchain network other than the current consensus node may also generate block submission voting information according to the block voting information received, and each consensus node may broadcast the generated block submission voting information. Therefore, the current consensus node may obtain the block submission voting information of the consensus nodes in the blockchain network for the second block. The block voting information refers to voting information generated by the consensus node in the blockchain network after verifying the second block. The block submission voting information refers to a voting result about whether the second block can be officially written into the blockchain, which is generated by the consensus node in the blockchain network after verifying and collecting statistics on the block voting information.

For example, an employee of a company has put forward a project plan. At the shareholders' meeting of the company, each shareholder can read and check the specific content of the project plan to check whether the content of the project plan meets the requirements in industry specifications, whether there are logical errors in the content of the project plan, whether there is plagiarism in the content of the project plan, and whether the content of the project plan meets the needs of the enterprise, etc., and then conduct a first vote based on the result of the check of the content of the project plan. Shareholders of the company can vote on the project plan. The vote can be an approval vote or a disapproval vote. For example, a shareholder may cast an approval vote when determining that the content of the project plan meets the requirements in industry specifications, there are no logical errors, there is no plagiarism, and the project plan meets the needs of the company; and cast a disapproval vote when determining that the content of the project plan does not meet the requirements in industry specifications, there are logical errors, there is plagiarism, or the project plan does not meet the needs of the company. Subsequently, each shareholder can vote for the second time according to the result of the first vote that he/she knows. For example, when a shareholder knows that more than half of the shareholders have cast an approval vote in the first vote, the shareholder may cast an approval vote in the second vote, that is, agree to implement the project plan; when a shareholder knows that less than half of the shareholders have cast an approval vote in the first vote, the shareholder may cast a disapproval vote in the second vote, that is, not agree to implement the project plan. It can be seen that in the first vote, each shareholder votes on the content of the project plan; and in the second vote, votes on the quantity of approval votes of the shareholders in the first vote. In this case, the project plan may be regarded as the second block, the shareholders may be regarded as the consensus nodes in the blockchain network, the first vote may be regarded as the block voting information, and the second vote may be regarded as the block submission voting information.

In some embodiments, a specific process of obtaining the block submission voting information may be as follows. The current consensus node may obtain an approval vote quantity for the second block in the first consensus stage according to the block voting information, where the block voting information may be approval voting information or disapproval voting information; the current consensus node may collect statistics on the block voting information corresponding to each consensus node in the blockchain network to obtain a total quantity of approval vote information, where the total quantity of approval vote information is the approval vote quantity for the second block in the first consensus stage. The current consensus node may determine third voting information of the current consensus node for the second block in the second consensus stage according to the approval vote quantity. Further, when the approval vote quantity is greater than or equal to a quantity threshold (where the quantity threshold is associated with a consensus algorithm used in the blockchain network; for example, in some consensus algorithms, the quantity threshold may refer to ⅔ of the quantity of consensus nodes in the blockchain network; in some consensus algorithms, the quantity threshold may refer to 51% of the quantity of consensus nodes in the blockchain network), the current consensus node determines according to the approval vote quantity that the third voting information of the current consensus node for the second block in the second consensus stage is submission success voting information, indicating that the approval vote quantity corresponding to the second block already reaches a condition for officially adding the second block to the blockchain. When the approval vote quantity is less than the quantity threshold, the current consensus node determines according to the approval vote quantity that the third voting information of the current consensus node for the second block in the second consensus stage is submission failure voting information, indicating that the approval vote quantity corresponding to the second block does not reach the condition for officially adding the second block to the blockchain.

After obtaining the third voting information, the current consensus node may broadcast the third voting information in the blockchain network, so that the other consensus nodes in the blockchain network other than the current consensus node obtain the third voting information. The other consensus nodes in the blockchain network may also obtain fourth voting information for the second block in the second consensus stage according to the block voting information obtained. Each of the other consensus nodes may broadcast the obtained fourth voting information in the blockchain network, so that the current consensus node may obtain the fourth voting information of the other consensus nodes for the second block in the second consensus stage. The current consensus node may determine the third voting information and the fourth voting information as the block submission voting information for the second block in the second consensus stage.

After obtaining the block submission voting information corresponding to each consensus node, the current consensus node may calculate a total information quantity of submission success voting information among the obtained block submission voting information, and determine the consensus result corresponding to the second block according to the total information quantity. The current consensus node may determine that the consensus result corresponding to the second block is successful in accordance with a determination that the total information quantity is greater than or equal to a quantity threshold, and perform accounting processing on the second block that passes the consensus, that is, officially add the second block to the blockchain. The current consensus node may determine that the consensus result corresponding to the second block is failed in accordance with a determination that the total information quantity is less than the quantity threshold, that is, the second block cannot be written into the blockchain. In some embodiments, if the approval vote quantity of the second block in the first consensus stage of the current consensus cycle is greater than or equal to the quantity threshold and the total information quantity of submission success voting information in the second consensus stage is less than the quantity threshold, the current consensus node may still set the second block to the locked state and store the second block in the locked state in the local database. If the approval vote quantity of the second block in the first consensus stage of the current consensus cycle is less than the quantity threshold and the total information quantity of submission success voting information in the second consensus stage is less than the quantity threshold, the current consensus node may determine that the second block does not pass consensus verification, and may delete the second block. In some embodiments, a quantity of times that the consensus process can be performed on a block may be preset in the blockchain network. For example, when the quantity of times is 2, if the consensus result of the second block in the third consensus cycle is still that the approval vote quantity of the second block in the first consensus stage of the current consensus cycle is greater than or equal to the quantity threshold and the total information quantity of submission success voting information in the second consensus stage is less than the quantity threshold, the current consensus node may delete the second block.

In some embodiments, the current consensus node verifies the block proposal message to obtain proposal voting information of the block proposal message in the first consensus stage, in accordance with a determination that there is no second block in the locked state in the current consensus node; obtains proposal submission voting information of the block proposal message in the second consensus stage according to the proposal voting information, and determines a consensus result corresponding to the block proposal message according to the proposal submission voting information; and performs accounting processing on the first block included in the block proposal message in accordance with a determination that the consensus result is a consensus success result. In other words, when there is no second block in the locked state in the local database of the current consensus node, consensus processing may be performed on the block proposal message within the current consensus cycle. The consensus processing on the block proposal message includes consensus processing on the first block, and is similar to the consensus processing on the second block. The current consensus node performs consensus verification on the block proposal message to obtain a verification result corresponding to the block proposal message, and generates proposal voting information of the current consensus node for the block proposal message in the first consensus stage according to the verification result. The current consensus node may also receive proposal voting information broadcast by the other consensus nodes, that is, the current consensus node may obtain the proposal voting information corresponding to each consensus node in the blockchain network. Further, the current consensus node may generate proposal submission voting information of the second block in the second consensus stage according to the received proposal voting information. The current consensus node may broadcast the proposal submission voting information generated by itself, and receive proposal submission voting information broadcast by the other consensus nodes. That is, the current consensus node may obtain the proposal submission voting information corresponding to each consensus node, and collect statistics on the obtained proposal submission voting information to obtain a total quantity of submission success voting information. When the total quantity of submission success voting information is greater than or equal to a quantity threshold, the current consensus node may determine that the block proposal message passes the consensus verification, and officially adds the first block in the block proposal message that passes the consensus verification to the blockchain. When a total quantity of approval vote information among the proposal voting information in the first consensus stage is greater than or equal to a quantity threshold and the total quantity of submission success voting information among the proposal submission voting information in the second consensus stage is less than the quantity threshold, the current consensus node may set the first block in the block proposal message to the locked state. When the total quantity of approval vote information among the proposal voting information in the first consensus stage is less than the quantity threshold and the total quantity of submission success voting information among the proposal submission voting information in the second consensus stage is less than the quantity threshold, the current consensus node may delete the block proposal message.

Because a block in the locked state may be stored in the local database of the current consensus node, the block in the locked state in the local database needs to be released before setting another block to the locked state, that is, the block in the locked state in the local database needs to be processed first.

Figure 5:
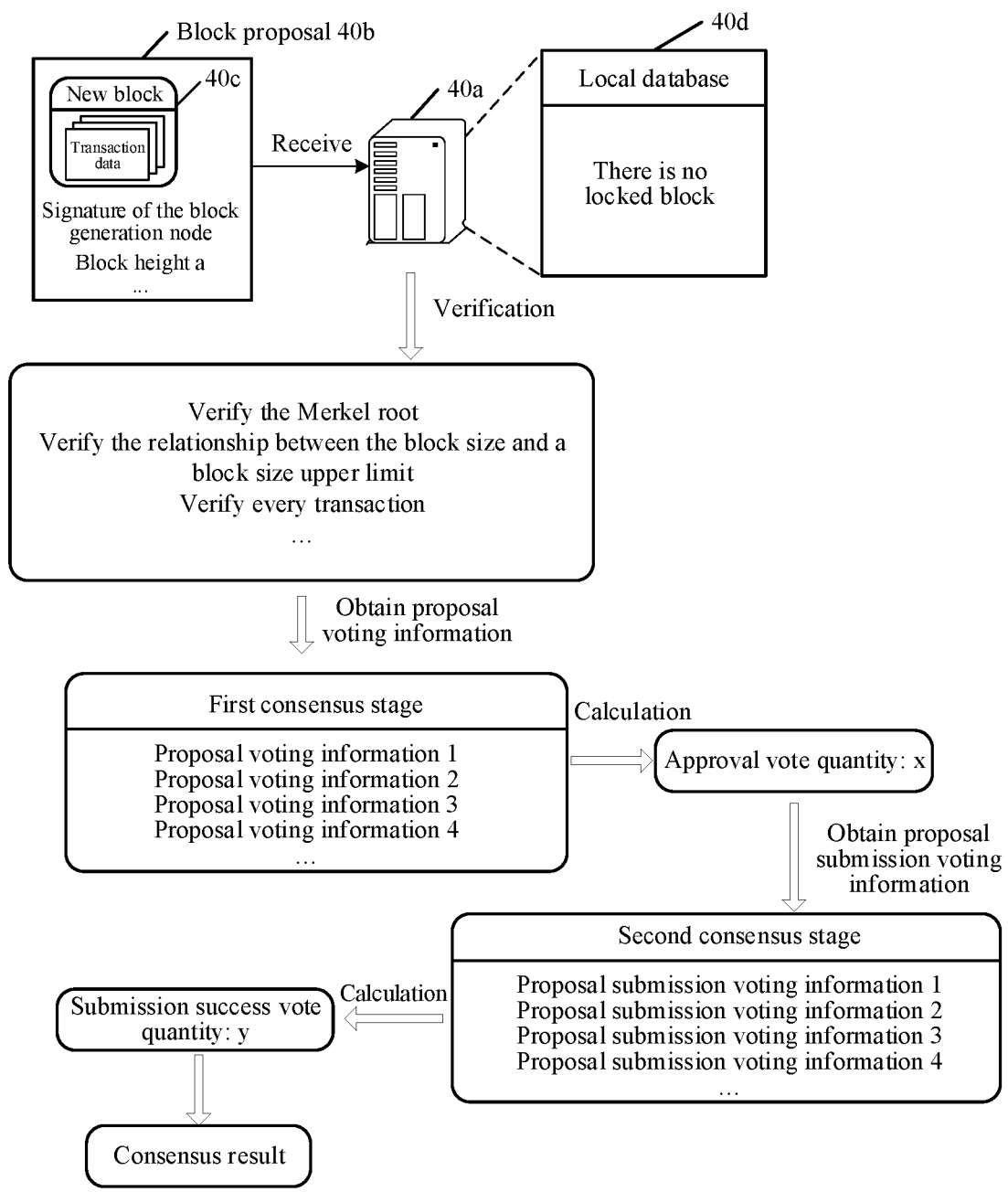
FIG. 5 is a schematic diagram of processing a block proposal message according to an embodiment of this application.

FIG. 5 is a schematic diagram of processing a block proposal message according to an embodiment of this application. As shown in FIG. 5, a consensus node 40a in a blockchain network (where the consensus node 40a in this case may be understood as a current consensus node) may receive a block proposal 40b. The block proposal 40b may be generated by another consensus node in the blockchain network (a consensus node other than the consensus node 40a). The block proposal 40b may include a new block 40c, a signature of the block generation node that generates the new block 40c, a block height a corresponding to the new block 40c, etc. The new block 40c may include a block header and a block body. The block header stores information such as a hash value corresponding to the new block 40c, a hash value of a previous block, a difficulty value, a timestamp, a version number, etc. The block body stores a plurality of pieces of transaction data uploaded by a client to the blockchain network. The consensus node 40a may detect data stored in a local database 40d. When there is no locked block (e.g., there is no block having a locked state) in the local database 40d, the consensus node 40a may perform consensus processing on the block proposal 40b in the current consensus cycle.

The consensus node 40a may perform consensus verification on the block proposal 40b, for example, verify the correctness of a Merkle root in the new block 40c included in the block proposal 40b, verify a relationship between the capacity of the new block and a block capacity upper limit in the blockchain network, verify a result of execution of each transaction data in the new block 40c, and so on. When the Merkle root in the new block 40c is correct, the capacity of the new block is smaller than the block capacity upper limit in the blockchain network, and the result of execution of each transaction data is a valid result, the consensus node 40a may determine that the block proposal 40b passes the verification process of the first consensus stage, and may generate proposal voting information of the consensus node 40a for the block proposal 40b in the first consensus stage, e.g., proposal voting information 1, according to the verification result. The consensus node 40a may broadcast the proposal voting information 1. The current consensus node may also obtain proposal voting information broadcast by the other consensus nodes for the block proposal 40b, e.g., proposal voting information 2, proposal voting information 3, proposal voting information 4, etc.

The consensus node 40a may collect statistics on all the obtained proposal voting information, and obtain an approval vote quantity x corresponding to the block proposal 40b in the first consensus stage. The consensus node 40a may generate proposal submission voting information, e.g., proposal submission voting information 1, in the second consensus stage according to the approval vote quantity x. When the approval vote quantity x is greater than or equal to ⅔ of the total quantity of all the consensus nodes, the proposal submission voting information 1 generated by the consensus node 40a is submission success voting information. When the approval vote quantity x is less than ⅔ of the total quantity of all the consensus nodes, the proposal submission voting information 1 generated by the consensus node 40a is submission failure voting information. Similarly, the consensus node 40a may broadcast the proposal submission voting information 1, and may also obtain proposal submission voting information broadcast by the other consensus nodes for the block proposal 40b. The consensus node 40a may collect statistics on the obtained proposal submission voting information respectively corresponding to all the consensus nodes, obtain a submission success vote quantity y corresponding to the block proposal 40b in the second consensus stage, and determine a consensus result corresponding to the block proposal 40b in the current consensus cycle according to the submission success vote quantity s. When the consensus result is a consensus success result, the consensus node 40a may officially write the block proposal 40b into the blockchain.

Figure 6:
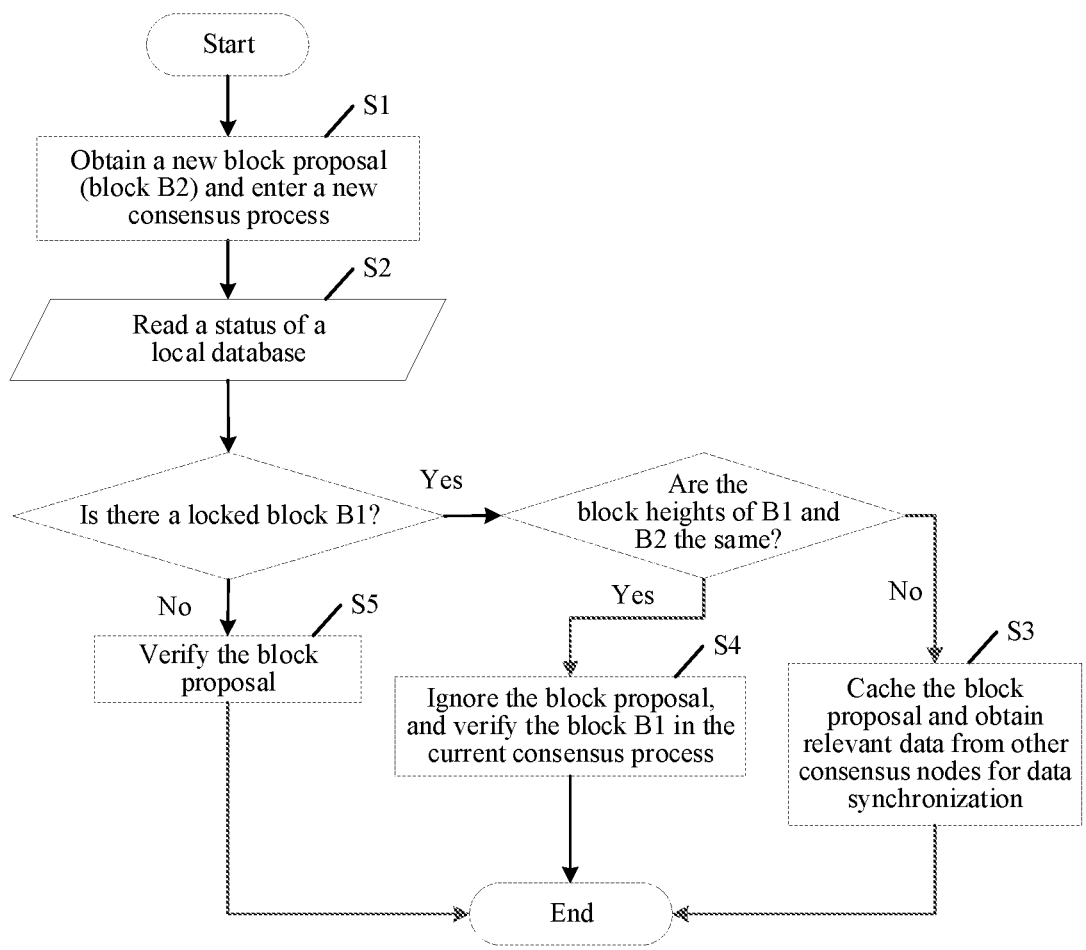
FIG. 6 is a schematic flowchart of a proposal processing process for a blockchain according to an embodiment of this application.

FIG. 6 is a schematic flowchart of a proposal processing process for a blockchain according to an embodiment of this application. As shown in FIG. 6, a process of processing a proposal message includes the following steps S1-S5:

In step S1, a current consensus node in a blockchain network may obtain a new block proposal and enter a new consensus process, that is, a new consensus cycle (where the new consensus cycle in this case may be referred to as a current consensus cycle). The new block proposal may include information such as a block B2 generated by a block generation node, a node identifier of the block generation node, a signature of the block generation node, an operating status of the block generation node, and a block height of the block B2. The new block proposal may be broadcast by another consensus node, that is, the current consensus node is a node participating in the consensus process of the block proposal; or the new block proposal may be generated by the current consensus node.

Step S2. After obtaining the new block proposal, the current consensus node may read a status of a local database of the current consensus node, mainly to detect whether there is a block in a locked state in the local database of the current consensus node. If the current consensus node does not have a block in the locked state, step S5 may be performed. If the current consensus node has a block B1 in the locked state, it is necessary to further check whether the block heights of block B1 and block B2 are the same. If the block heights of block B1 and block B2 are the same, it indicates that no final consensus has been reached for block B1 in the previous consensus process (i.e., the previous consensus cycle), and the current consensus node may perform consensus processing on block B1 again, that is, continue to perform step S4. If the block heights of block B1 and block B2 are different (because block B1 is in the locked state, it means that block B1 has undergone consensus processing before, and the block heights being different may refer specifically to that the block height of block B1 is less than the block height of block B2), it indicates that block B1 has been written by the other consensus nodes, that is, accounting process on block B1 has been completed, so the current consensus node may continue to perform step S3.

Step S3. When the block height of block B1 is less than the block height of block B2, the current consensus node may cache block B2 in the local database, and obtain relevant data of block B1 from the other consensus nodes for data synchronization, to maintain the consistency between blockchain data of the current consensus node and blockchain data of the other consensus nodes.

Step S4. When the block height of block B1 is the same as the block height of block B2, the current consensus node may ignore block B2, verify block B1 in the current consensus cycle, and obtain first voting information of block B1, i.e., block voting information of the current consensus node for block B1 in the first consensus stage. The current consensus node may broadcast the first voting information, to notify all the consensus nodes in the blockchain network whether the current consensus node accepts block B1. The current consensus node may obtain block voting information of each consensus node for block B1 in the first consensus stage, and generate third voting information of block B1 in the second consensus stage according to a quantity of approval votes among the block voting information, where the third voting information is block submission voting information of the current consensus node for block B1 in the second consensus stage. After obtaining the block submission voting information of each consensus node for block B1 in the second consensus stage, the current consensus node may calculate a quantity of submission success voting information among the obtained block submission voting information, and determine according to the quantity of submission success voting information whether a final consensus is reached on block B1. For example, if the quantity of submission success voting information reaches ⅔ of the quantity of consensus nodes in the blockchain network, it is determined that a final consensus is reached on block B1. If the quantity of submission success voting information does not reach ⅔ of the quantity of consensus nodes in the blockchain network, it is determined that no final consensus is reached on block B1.

In step S5: If there is no block in the locked state in the current consensus node, the current consensus node may verify the block proposal in the current consensus cycle to obtain proposal voting information of the block proposal in the first consensus stage. The process of verifying the block proposal is the same as the process of verifying block B1, so the details will not be repeated herein. Similarly, the current consensus node may obtain a final consensus result corresponding to the block proposal according to the proposal voting information of the block proposal in the first consensus stage.

In the embodiments of this application, a first block in a block proposal message is obtained. If a current consensus node has a second block in a locked state and a block height of the first block is the same as a block height of the second block, the block proposal message is deleted, and block voting information of the second block in a first consensus stage is obtained, where the locked state is a state of a block that has passed the first consensus stage and has not passed a second consensus stage. Block submission voting information of the second block in the second consensus stage is obtained according to the block voting information; and a consensus result corresponding to the second block is determined according to the block submission voting information. It can be seen that the consensus process for a block in the blockchain network may include the first consensus stage and the second consensus stage. When receiving a block proposal message, the current consensus node may detect whether the current consensus node has a block in the locked state locally. If the current consensus node has a block in the locked state locally, the current consensus node may preferentially perform a consensus verification on the locked block to obtain a consensus result corresponding to the block in the locked state, and determine whether to add the block in the locked state to the blockchain based on the consensus result. Accordingly, the quality of blocks added to the blockchain can be ensured, and by introducing the block locked state, the risk of inconsistency of data on the blockchain can be reduced.

Figure 7:
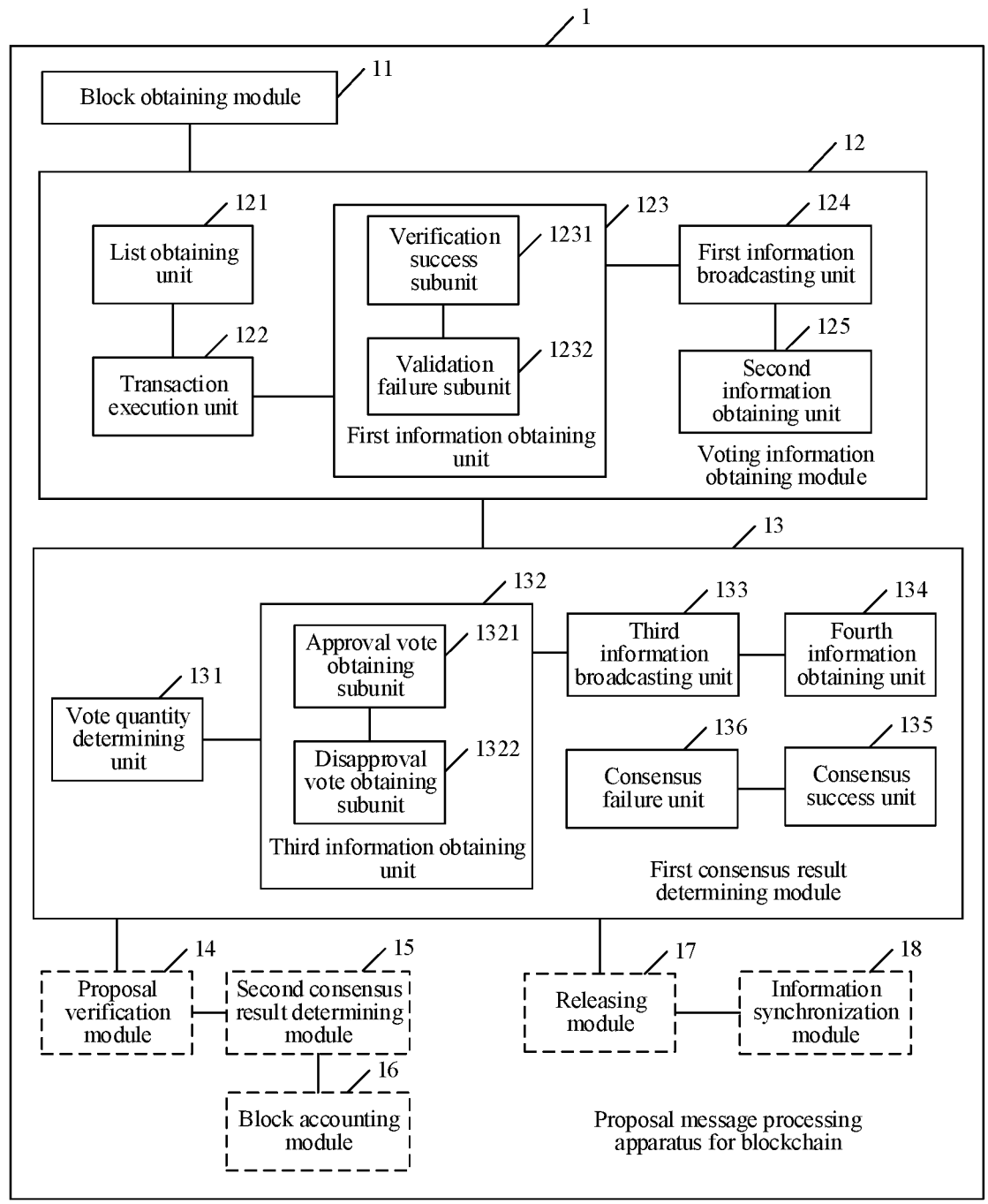
FIG. 7 is a schematic structural diagram of a proposal message processing apparatus for a blockchain according to an embodiment of this application.

FIG. 7 is a schematic structural diagram of a proposal message processing apparatus for a blockchain according to an embodiment of this application. The proposal message processing apparatus for a blockchain may be a computer-readable program (including a program code and executable instructions) running in a computer device. For example, the proposal message processing apparatus for a blockchain is an application software. The apparatus may be configured to execute the corresponding steps in the method provided in the embodiments of this application. As shown in FIG. 7, the proposal message processing apparatus 1 for a blockchain may include: a block obtaining module 11, a voting information obtaining module 12, and a first consensus result determining module 13.

The block obtaining module 11 is configured to obtain a block proposal message, and obtaining a first block from the block proposal message.

The voting information obtaining module 12 is configured to delete the block proposal message in accordance with a determination that the current consensus node has a second block in a locked state and a block height of the first block is the same as a block height of the second block, and obtain block voting information of the second block in a first consensus stage, the locked state being a state of a block that has passed the first consensus stage and has not passed a second consensus stage.

The first consensus result determining module 13 is configured to obtain block submission voting information of the second block in the second consensus stage according to the block voting information, and determine a consensus result corresponding to the second block according to the block submission voting information.

For implementations of specific functions of the block obtaining module 11, the voting information obtaining module 12, and the first consensus result determining module 13, reference may be made to step S101 to step S103 in the embodiment corresponding to FIG. 3, which will not be repeated here.

Referring to FIG. 7, the voting information module 12 may include: a list obtaining unit 121, a transaction execution unit 122, a first information obtaining unit 123, a first information broadcasting unit 124, and a second information obtaining unit 125.

The list obtaining unit 121 is configured to obtain a block generation node corresponding to the second block, and obtaining a node committee list in a blockchain network, the node committee list including consensus nodes in the blockchain network that are in a valid operating state.

The transaction execution unit 122 is configured to execute transaction data included in the second block to obtain a transaction result corresponding to the transaction data.

The first information obtaining unit 123 is configured to determine first voting information of the current consensus node for the second block in the first consensus stage according to the block generation node, the node committee list, and the transaction result.

The first information broadcasting unit 124 is configured to broadcast the first voting information in the blockchain network, so that the other consensus nodes in the blockchain network other than the current consensus node obtain the first voting information.

The second information obtaining unit 125 is configured to obtain second voting information of the other consensus nodes for the second block in the first consensus stage, and determine the first voting information and the second voting information as the block voting information of the second block in the first consensus stage.

For implementations of specific functions of the list obtaining unit 121, the transaction execution unit 122, the first information obtaining unit 123, the first information broadcasting unit 124, and a second information obtaining unit 125, reference may be made to step S102 in the embodiment corresponding to FIG. 3, which will not be repeated here.

Referring to FIG. 7, the first information obtaining unit 123 may include: a verification success subunit 1231 and a verification failure subunit 1232.

The verification success subunit 1231 is configured to determine that a verification result of the second block in the first consensus stage is a verification success result in accordance with a determination that the block generation node belongs to the node committee list and the transaction result is a valid result, and generate the first voting information corresponding to the current consensus node according to the verification success result.

The verification failure subunit 1232 is configured to determine that the verification result of the second block in the first consensus stage is a verification failure result in accordance with a determination that the block generation node does not belong to the node committee list or the transaction result is an invalid result, and generating the first voting information corresponding to the current consensus node according to the verification failure result.

For implementations of specific functions of the verification success subunit 1231 and the verification failure subunit 1232, reference may be made to step S102 in the embodiment corresponding to FIG. 3, which will not be repeated here.

Referring to FIG. 7, the proposal message processing apparatus 1 for a blockchain may further include: a proposal verification module 14, a second consensus result determining module 15, a block accounting module 16, a releasing module 17, and an information synchronization module 18.

The proposal verification module 14 is configured to verify the block proposal message to obtain proposal voting information of the block proposal message in the first consensus stage, in accordance with a determination that there is no second block in the locked state in the current consensus node.

The second consensus result determining module 15 is configured to obtain proposal submission voting information of the block proposal message in the second consensus stage according to the proposal voting information, and determining a consensus result corresponding to the block proposal message according to the proposal submission voting information.

The block accounting module 16 is configured to perform accounting processing on the first block included in the block proposal message in accordance with a determination that the consensus result is a consensus success result.

The releasing module 17 is configured to switch the locked state corresponding to the second block to a released state in accordance with a determination that the current consensus node has the second block in the locked state and the block height of the first block is greater than the block height of the second block, and determine the second block in the released state as a valid block.

The information synchronization module 18 is configured to obtain synchronization information associated with the second block from the blockchain network, and performing accounting processing on the synchronization information and the valid block.

For implementations of specific functions of the proposal verification module 14, the second consensus result determining module 15, and the block accounting module 16, reference may be made to step S103 in the embodiment corresponding to FIG. 3, and for implementations of specific functions of the releasing module 17 and the information synchronization module 18, reference may be made to step S102 in the embodiment corresponding to FIG. 3, which will not be repeated here.

Referring to FIG. 7, the first consensus result determining module 13 may include: a vote quantity determining unit 131, a third information obtaining unit 132, a third information broadcasting unit 133, and a fourth information obtaining unit 134.

The vote quantity determining unit 131 is configured to obtain an approval vote quantity for the second block in the first consensus stage according to the block voting information, the approval vote quantity being a total quantity of approval vote information among the block voting information of the consensus nodes in the blockchain network.

The third information obtaining unit 132 is configured to determine third voting information of the current consensus node for the second block in the second consensus stage according to the approval vote quantity.

The third information broadcasting unit 133 is configured to broadcast the third voting information in the blockchain network, so that the other consensus nodes in the blockchain network other than the current consensus node obtain the third voting information.

The fourth information obtaining unit 134 is configured to obtain fourth voting information of the other consensus nodes for the second block in the second consensus stage, and determining the third voting information and the fourth voting information as the block submission voting information of the second block in the second consensus stage.

For implementations of specific functions of the vote quantity determining unit 131, the third information obtaining unit 132, the third information broadcasting unit 133, and the fourth information obtaining unit 134, reference may be made to step S103 in the embodiment corresponding to FIG. 3, which will not be repeated here.

Referring to FIG. 7, the third information obtaining unit 132 may include: an approval vote obtaining subunit 1321 and a disapproval vote obtaining subunit 1322.

The approval vote obtaining subunit 1321 is configured to determine according to the approval vote quantity that the third voting information of the current consensus node for the second block in the second consensus stage is submission success voting information, in accordance with a determination that the approval vote quantity is greater than or equal to a quantity threshold.

The disapproval vote obtaining subunit 1322 is configured to determine according to the approval vote quantity that the third voting information of the current consensus node for the second block in the second consensus stage is submission failure voting information, in accordance with a determination that the approval vote quantity is less than the quantity threshold.

For implementations of specific functions of the approval vote obtaining subunit 1321 and the disapproval vote obtaining subunit 1322, reference may be made to step S103 in the embodiment corresponding to FIG. 3, which will not be repeated here.

Referring to FIG. 7, the first consensus result determining module 13 may further be configured to:
    calculate a total information quantity of submission success voting information among the block submission voting information, and determine the consensus result corresponding to the second block according to the total information quantity.

The first consensus result determining module 13 may include: a consensus success unit 135 and a consensus failure unit 136.

The consensus success unit 135 is configured to determine that the consensus result corresponding to the second block is successful in accordance with a determination that the total information quantity is greater than or equal to a quantity threshold, and perform accounting processing on the second block that passes the consensus.

The consensus failure unit 136 is configured to determine that the consensus result corresponding to the second block is failed in accordance with a determination that the total information quantity is less than the quantity threshold.

For implementations of specific functions of the consensus success unit 135 and the consensus failure unit 136, reference may be made to step S103 in the embodiment corresponding to FIG. 3, which will not be repeated here.

In an embodiment, the proposal message processing apparatus for a blockchain may further include:

- a block processing module, configured to maintain the locked state of the second block, in accordance with a determination that the consensus result corresponding to the second block is failed, an approval vote quantity determined based on the block voting information is greater than or equal to a quantity threshold, and a total information quantity of submission success voting information determined based on the block submission voting information is less than a quantity threshold.

In an embodiment, the block processing module is further configured to delete the second block in accordance with a determination that the second block is in the locked state for a preset quantity of consecutive times.

In an embodiment, the block processing module is further configured to delete the second block, in accordance with a determination that the consensus result corresponding to the second block is failed, an approval vote quantity determined based on the block voting information is less than a quantity threshold, and a total information quantity of submission success voting information determined based on the block submission voting information is less than a quantity threshold.

In the embodiments of this application, a first block in a block proposal message is obtained; if a current consensus node has a second block in a locked state and a block height of the first block is the same as a block height of the second block, the block proposal message is deleted, and block voting information of the second block in a first consensus stage is obtained, where the locked state is a state of a block that has passed the first consensus stage and has not passed a second consensus stage; block submission voting information of the second block in the second consensus stage is obtained according to the block voting information; and a consensus result corresponding to the second block is determined according to the block submission voting information. It can be seen that the consensus process for a block in the blockchain network may include the first consensus stage and the second consensus stage. When receiving a block proposal message, the current consensus node may detect whether the current consensus node has a block in the locked state locally. If the current consensus node has a block in the locked state locally, the current consensus node may preferentially perform a consensus verification on the locked block to obtain a consensus result corresponding to the block in the locked state, and determine whether to add the block in the locked state to the blockchain based on the consensus result. Whereby, the quality of blocks added to the blockchain can be ensured, and by introducing the block locked state, the risk of inconsistency of data on the blockchain can be reduced.

Figure 8:
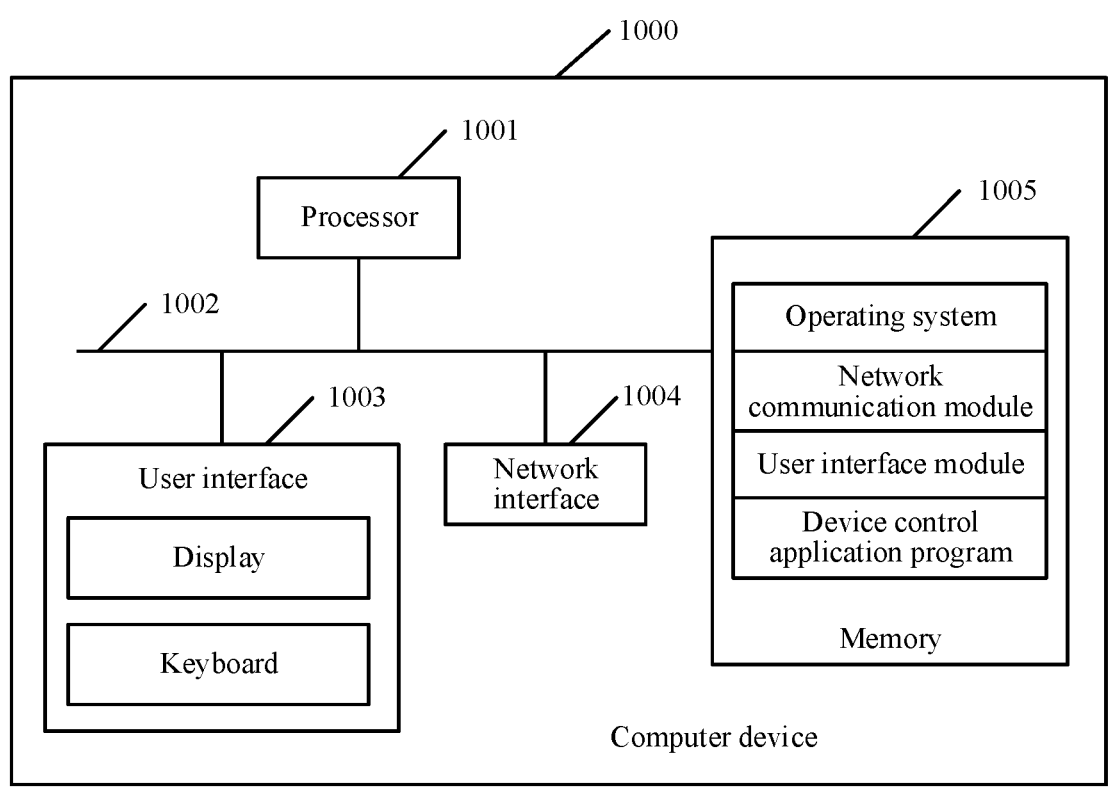
FIG. 8 is a schematic structural diagram of a computer device according to an embodiment of this application.

FIG. 8 is a schematic structural diagram of a computer device according to an embodiment of this application. As shown in FIG. 8, the computer device 1000 may include: a processor 1001, a network interface 1004, and a memory 1005. In addition, the computer device 1000 may further include a user interface 1003 and at least one communication bus 1002. The communication bus 1002 is configured to implement connection and communication between these components. The user interface 1003 may include a display and a keyboard. In some embodiments, the user interface 1003 may further include a standard wired interface and a standard wireless interface. In some embodiments, the network interface 1004 may include a standard wired interface and a standard wireless interface (for example, a Wi-Fi interface). The memory 1004 may be a high-speed random access memory (RAM), or may be a non-volatile memory, for example, at least one magnetic disk memory. In some embodiments, the memory 1005 may alternatively be at least one storage apparatus located away from the processor 1001. As shown in FIG. 8, the memory 1005 used as a computer-readable storage medium may include an operating system, a network communication module, a user interface module, and a device control application.

In the computer device 1000 shown in FIG. 8, the network interface 1004 may provide a network communication function, The user interface 1003 is mainly configured to provide an input interface for a user. The processor 1001 may be configured to invoke the device control application stored in the memory 1005 to implement the following operations:

- obtaining a block proposal message, and obtaining a first block from the block proposal message;
- deleting the block proposal message in accordance with a determination that the current consensus node has a second block in a locked state and a block height of the first block is the same as a block height of the second block, and obtaining block voting information of the second block in a first consensus stage, the locked state being a state of a block that has passed the first consensus stage and has not passed a second consensus stage;
- obtaining block submission voting information of the second block in the second consensus stage according to the block voting information, and determining a consensus result corresponding to the second block according to the block submission voting information.

It is to be understood that the computer device 1000 described in this embodiment of this application can implement the descriptions of the proposal message processing method for a blockchain in the embodiment corresponding to FIG. 3, and can also implement the descriptions of the proposal message processing apparatus 1 for a blockchain in the embodiment corresponding to FIG. 7, and the details will not be described herein again. In addition, the description of beneficial effects of the same method also will not be described herein again.

In addition, an embodiment of this application further provides a non-transitory computer-readable storage medium. The computer-readable storage medium stores a computer program executed by the above proposal message processing apparatus 1 for a blockchain, and the computer program includes program instructions. When executing the program instructions, the processor can perform the descriptions of the descriptions of the proposal message processing method for a blockchain in the embodiment corresponding to FIG. 3, so the details will not be described herein again. In addition, the description of beneficial effects of the same method also will not be described herein again. For technical details that are not disclosed in the embodiments of the computer-readable storage medium of this application, refer to the method embodiments of this application. In an example, the program instruction may be deployed to be executed on a computing device, or deployed to be executed on a plurality of computing devices at the same location, or deployed to be executed on a plurality of computer devices that are distributed in a plurality of locations and interconnected through a communication network. The plurality of computing devices that are distributed in the plurality of locations and interconnected through the communication network may form a blockchain network.

A person of ordinary skill in the art may understand that all or some of the processes of the methods in the embodiments may be implemented by computer-readable instructions instructing relevant hardware. The computer-readable instructions may be stored in a computer-readable storage medium. When the program is executed, the procedures of the foregoing method embodiments are performed. The storage medium may be a magnetic disc, an optical disc, a read-only memory (ROM), or a random access memory (RAM).

The foregoing disclosure is merely exemplary embodiments of this application, and certainly is not intended to limit the protection scope of this application. Therefore, equivalent variations made in accordance with the claims of this application fall within the scope of this application.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs consensus verification and/or information broadcasting. In practical application, the foregoing functions may be allocated to and completed by different functional modules according to requirements, that is, an inner structure of a device is divided into different functional modules to implement all or a part of the functions described above.

What is claimed is:

1. A proposal message processing method for a blockchain network, executed by a computer device, the method comprising:

obtaining a block proposal message;
obtaining a first block from the block proposal message;
in accordance with a determination that (i) a current consensus node of the computer device has a second block in a locked state and (ii) a block height of the first block is the same as a block height of the second block, wherein the locked state is a state of a block that has passed a first consensus stage and has not passed a second consensus stage, the first consensus stage occurring earlier in time than the second consensus stage:
  deleting the block proposal message;
  obtaining block voting information of the second block in the first consensus stage;
  generating block submission voting information of the second block in the second consensus stage according to the block voting information;
  broadcasting, to other computing devices corresponding to other consensus nodes of the blockchain network, the generated block submission voting information; and
  determining a consensus result corresponding to the second block according to the generated block submission voting information.

2. The method according to claim 1, wherein obtaining the block voting information of the second block in the first consensus stage comprises:

obtaining a block generation node corresponding to the second block;
obtaining a node committee list in the blockchain network, the node committee list comprising consensus nodes in the blockchain network that are in a valid operating state;
executing transaction data comprised in the second block to obtain a transaction result corresponding to the transaction data;
determining first voting information of the current consensus node for the second block in the first consensus stage according to the block generation node, the node committee list, and the transaction result;
broadcasting the first voting information in the blockchain network so that the first voting information can be obtained by other consensus nodes in the blockchain network, the other consensus nodes distinct from the current consensus node;
obtaining second voting information of the other consensus nodes for the second block in the first consensus stage; and
determining the first voting information and the second voting information as the block voting information of the second block in the first consensus stage.

3. The method according to claim 2, wherein determining the first voting information of the current consensus node for the second block in the first consensus stage comprises:

in accordance with a determination that the block generation node belongs to the node committee list and the transaction result is a valid result:
  determining that a verification result of the second block in the first consensus stage is a verification success result; and
  generating the first voting information corresponding to the current consensus node according to the verification success result; and
in accordance with a determination that the block generation node does not belong to the node committee list or the transaction result is an invalid result:

determining that the verification result of the second block in the first consensus stage is a verification failure result; and
generating the first voting information corresponding to the current consensus node according to the verification failure result.

4. The method according to claim 1, further comprising:
in accordance with a determination that there is no second block in the locked state in the current consensus node:
verifying the block proposal message to obtain proposal voting information of the block proposal message in the first consensus stage;
obtaining proposal submission voting information of the block proposal message in the second consensus stage according to the proposal voting information;
determining a consensus result corresponding to the block proposal message according to the proposal submission voting information; and
in accordance with a determination that the consensus result is a consensus success result, performing accounting processing on the first block comprised in the block proposal message.

5. The method according to claim 1, further comprising:
in accordance with a determination that the current consensus node has the second block in the locked state and the block height of the first block is greater than the block height of the second block:
switching the locked state corresponding to the second block to a released state;
determining the second block in the released state as a valid block;
obtaining synchronization information associated with the second block from the blockchain network; and
performing accounting processing on the synchronization information and the valid block.

6. The method according to claim 1, wherein generating the block submission voting information of the second block in the second consensus stage according to the block voting information comprises:
obtaining an approval vote quantity for the second block in the first consensus stage according to the block voting information, the approval vote quantity being a total quantity of approval vote information among the block voting information of the consensus nodes in the blockchain network;
determining third voting information of the current consensus node for the second block in the second consensus stage according to the approval vote quantity;
broadcasting the third voting information in the blockchain network, so that the other consensus nodes in the blockchain network other than the current consensus node obtain the third voting information;
obtaining fourth voting information of the other consensus nodes for the second block in the second consensus stage; and
determining the third voting information and the fourth voting information as the block submission voting information of the second block in the second consensus stage.

7. The method according to claim 6, wherein determining the third voting information of the current consensus node for the second block in the second consensus stage according to the approval vote quantity comprises:
in accordance with a determination that the approval vote quantity is greater than or equal to a quantity threshold, determining according to the approval vote quantity that the third voting information of the current consensus node for the second block in the second consensus stage is submission success voting information; and
in accordance with a determination that the approval vote quantity is less than the quantity threshold, determining according to the approval vote quantity that the third voting information of the current consensus node for the second block in the second consensus stage is submission failure voting information.

8. The method according to claim 1, wherein determining the consensus result corresponding to the second block according to the block submission voting information comprises:
calculating a total information quantity of submission success voting information among the block submission voting information; and
determining the consensus result corresponding to the second block according to the total information quantity.

9. The method according to claim 8, wherein determining the consensus result corresponding to the second block according to the total information quantity comprises:
in accordance with a determination that the total information quantity is greater than or equal to a quantity threshold:
determining that the consensus result corresponding to the second block is successful; and
performing accounting processing on the second block that passes the consensus; and
in accordance with a determination that the total information quantity is less than the quantity threshold, determining that the consensus result corresponding to the second block is failed.

10. The method according to claim 1, further comprising:
in accordance with a determination that the consensus result corresponding to the second block is failed;
maintaining the locked state of the second block;
determining an approval vote quantity in accordance with a determination that the block voting information is greater than or equal to a quantity threshold; and
determining a total information quantity of submission success voting information determined in accordance with a determination that the block submission voting information is less than a quantity threshold.

11. The method according to claim 10, further comprising:
in accordance with a determination that the second block is in the locked state for a preset quantity of consecutive times, deleting the second block.

12. The method according to claim 1, further comprising:
in accordance with a determination deleting the second block, in a case that the consensus result corresponding to the second block is failed:
deleting the second block;
determining an approval vote quantity in accordance with a determination that the block voting information is less than a quantity threshold; and
determining a total information quantity of submission success voting information in accordance with a determination that the block submission voting information is less than a quantity threshold.

13. A computer device for processing proposal messages for a blockchain network, the computer device comprising:
one or more processors; and
memory storing one or more programs, the one or more programs comprising instructions that, when executed by the one or more processors, cause the one or more processors to perform operations comprising:
obtaining a block proposal message;
obtaining a first block from the block proposal message;
in accordance with a determination that (i) a current consensus node of the computer device has a second block in a locked state and (ii) a block height of the first block is the same as a block height of the second block, wherein the locked state is a state of a block that has passed a first consensus stage and has not passed a second consensus stage, the first consensus stage occurring earlier in time than the second consensus stage:
deleting the block proposal message;
obtaining block voting information of the second block in the first consensus stage; and
generating block submission voting information of the second block in the second consensus stage according to the block voting information;
broadcasting, to other computing devices corresponding to other consensus nodes of the blockchain network, the generated block submission voting information; and
determining a consensus result corresponding to the second block according to the block submission voting information.

14. The computer device according to claim 13, wherein obtaining the block voting information of the second block in the first consensus stage comprises:
obtaining a block generation node corresponding to the second block;
obtaining a node committee list in the blockchain network, the node committee list comprising consensus nodes in the blockchain network that are in a valid operating state;
executing transaction data comprised in the second block to obtain a transaction result corresponding to the transaction data;
determining first voting information of the current consensus node for the second block in the first consensus stage according to the block generation node, the node committee list, and the transaction result;
broadcasting the first voting information in the blockchain network so that the first voting information can be obtained by other consensus nodes in the blockchain network, the other consensus nodes distinct from the current consensus node;
obtaining second voting information of the other consensus nodes for the second block in the first consensus stage; and
determining the first voting information and the second voting information as the block voting information of the second block in the first consensus stage.

15. The computer device according to claim 14, wherein determining the first voting information of the current consensus node for the second block in the first consensus stage comprises:
in accordance with a determination that the block generation node belongs to the node committee list and the transaction result is a valid result:
determining that a verification result of the second block in the first consensus stage is a verification success result; and
generating the first voting information corresponding to the current consensus node according to the verification success result; and in accordance with a determination that the block generation node does not belong to the node committee list or the transaction result is an invalid result:
determining that the verification result of the second block in the first consensus stage is a verification failure result; and
generating the first voting information corresponding to the current consensus node according to the verification failure result.

16. The computer device according to claim 13, the operations further comprising:
in accordance with a determination that there is no second block in the locked state in the current consensus node:
verifying the block proposal message to obtain proposal voting information of the block proposal message in the first consensus stage;
obtaining proposal submission voting information of the block proposal message in the second consensus stage according to the proposal voting information;
determining a consensus result corresponding to the block proposal message according to the proposal submission voting information; and
in accordance with a determination that the consensus result is a consensus success result, performing accounting processing on the first block comprised in the block proposal message.

17. The computer device according to claim 13, the operations further comprising:
in accordance with a determination that the current consensus node has the second block in the locked state and the block height of the first block is greater than the block height of the second block:
switching the locked state corresponding to the second block to a released state;
determining the second block in the released state as a valid block; obtaining synchronization information associated with the second block from the blockchain network; and
performing accounting processing on the synchronization information and the valid block.

18. A non-transitory computer-readable storage medium, storing a computer program, the computer program, when executed by one or more processors of a computer device, causes the one or more processors to perform operations for processing proposal messages for a blockchain network, the operations comprising:
obtaining a block proposal message; and
obtaining a first block from the block proposal message;
in accordance with a determination that (i) a current consensus node of the computer device has a second block in a locked state and (ii) a block height of the first block is the same as a block height of the second block, wherein the locked state is a state of a block that has passed a first consensus stage and has not passed a second consensus stage, the first consensus stage occurring earlier in time than the second consensus stage:
deleting the block proposal message; and
obtaining block voting information of the second block in a the first consensus stage; the locked state being a state of a block that has passed the first consensus stage and has not passed a second consensus stage;
generating block submission voting information of the second block in the second consensus stage according to the block voting information;

broadcasting, to other computing devices corresponding to other consensus nodes of the blockchain network, the generated block submission voting information; and determining a consensus result corresponding to the second block according to the block submission voting information.

19. The non-transitory computer-readable storage medium according to claim 18, wherein obtaining the block submission voting information of the second block in the second consensus stage according to the block voting information comprises:

obtaining an approval vote quantity for the second block in the first consensus stage according to the block voting information, the approval vote quantity being a total quantity of approval vote information among the block voting information of the consensus nodes in the blockchain network;

determining third voting information of the current consensus node for the second block in the second consensus stage according to the approval vote quantity;

broadcasting the third voting information in the blockchain network, so that the other consensus nodes in the blockchain network other than the current consensus node obtain the third voting information;

obtaining fourth voting information of the other consensus nodes for the second block in the second consensus stage; and determining the third voting information and the fourth voting information as the block submission voting information of the second block in the second consensus stage.

20. The non-transitory computer-readable storage medium according to claim 19, wherein determining the third voting information of the current consensus node for the second block in the second consensus stage according to the approval vote quantity comprises:

in accordance with a determination that the approval vote quantity is greater than or equal to a quantity threshold, determining according to the approval vote quantity that the third voting information of the current consensus node for the second block in the second consensus stage is submission success voting information; and in accordance with a determination that the approval vote quantity is less than the quantity threshold, determining according to the approval vote quantity that the third voting information of the current consensus node for the second block in the second consensus stage is submission failure voting information.

* * * * *